Patented Feb. 17, 1942

2,273,321

UNITED STATES PATENT OFFICE 2,273,321

AMINO AZYL POLYSULPHIDES AND METHOD OF MAKING THE SAME

Paul C. Jones, Akron, Ohio, assignor to The B. F. Goodrich Company, New York, N. Y., a corporation of New York No Drawing. Application April 25, 1940, Serial No. 331,638

10 Claims. (Cl. 260—302)

This invention relates to amino azyl polysulphides not hitherto known, and to a method of making the same.

The new compounds of this invention contain the general structural formula

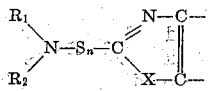

wherein

represents an aliphatic amino group, $n$ represents 2 or 3, and X represents —S—, —O—, or —NH—.

$R_1$ and $R_2$ may represent methyl, ethyl, isopropyl, amyl, 2-hydroxy-ethyl, 2-aminoethyl, methoxyethyl, cyclohexyl, ac-tetrahydronaphthyl, benzyl, p-methylbenzyl, or similar alkyl, aralkyl, or cycloalkyl groups. Either $R_1$ or $R_2$ may represent hydrogen and $R_1$ and $R_2$ may together constitute a saturated carbon chain such as the pentamethylene group which may be interrupted by a —S—, —O—, or —NH— group.

The azyl portion of the compound is either thiazyl, oxazyl, or imidazyl, depending upon the group represented by X.

The compounds of this invention are prepared by reacting an azyl tri- or tetrasulphide having the structural formula

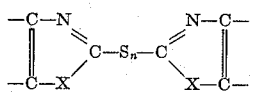

wherein X represents —S—, —O—, or —NH—, and $n$ represents 3 or 4, with an aliphatic primary or secondary amine. Although solvents may be present if desired, the polysulphide is ordinarily simply dissolved in the liquid amine and the reaction proceeds spontaneously. An ammonium azyl sulphide is produced as a by-product of the reaction together with the desired amino azyl polysulphide. It is believed that the reaction proceeds according to the following stoichiometric equation:

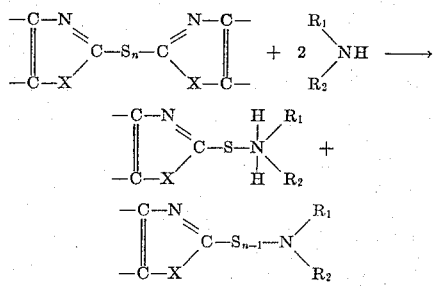

The yields are in general better if an excess of the amine is employed, although this is not necessary for the success of the reaction. The reaction proceeds spontaneously when the polysulphide is dissolved in the amine. Gentle heat is ordinarily applied after the spontaneous reaction has ceased to insure completion of the reaction.

The azyl tri and tetrasulphides are easily made by the well known reaction of sulphur chloride with the corresponding mercaptoazole or a salt thereof.

As a specific example of the method of this invention, 35.2 gms. (.1 mol.) of di-4,5-dimethylthiazyl tetrasulphide were dissolved in 29.2 gms. (.4 mol.) of diethylamine. The temperature rose spontaneously to 52° C. The mixture was then warmed to 65° C. and maintained at that temperature for a minute. Upon cooling, crystallization took place and the mixture set to a stiff paste. The paste was extracted with ether, leaving behind the ether-insoluble solid diethylammonium 4,5-dimethylthiazyl sulphide. When the excess diethylamine and ether were removed from the ether extract by evaporation, the dark amber oil which remained was identified as the desired product diethylamino 4,5-dimethylthiazyl trisulphide.

In another example, 35.2 gms. (.1 mol.) of di-4,5-dimethylthiazyl tetrasulphide were dissolved in 19.8 gms. (.2 mol.) of cyclohexylamine. The temperature spontaneously rose to 53° C. The reaction mixture was then warmed to 70° C., held there for 2 minutes, and allowed to cool. The dark brown oil which was extracted with ether was cyclohexylamino 4,5-dimethylthiazyl trisulphide.

In the above examples, di-4,5-dimethyloxazyl tetrasulphide, di-4,5-dimethylimidazyl tetrasulphide, di-4-ethylthiazyl tetrasulphide, di-4-phenylthiazyl tetrasulphide, di-4,5-dimethylthiazyl trisulphide, di-benzothiazyl tetrasulphide, di-naphthothiazyl tetrasulphide, and similar azyl tri- or tetrasulphides may be employed in place of the di-4,5-dimethylthiazyl tetrasulphide. The amines may also be replaced by dibutyl amine, cyclohexyl amine, dicyclohexyl amine, benzyl amine, ethylene diamine, triethylene tetramine, diethylene triamine, diethanolamine, morpholine, piperidine, or other aliphatic primary or secondary amines. Where polyamines are employed, a larger quantity of polysulphide will be required if it is desired to substitute all amino groups, which will be readily understood by those skilled in the art.

The compounds of this invention are useful as accelerating and vulcanizing agents as disclosed in my copending application Serial No. 331,639, filed April 25, 1940.

Although I have herein disclosed specific embodiments of my invention, I do not intend to limit the invention solely thereto, for many modifications and variations are within the spirit and scope of the invention as defined in the appended claims.

I claim:

1. Compounds having the general structural formula

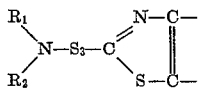

wherein

represents an aliphatic amino group.

2. Compounds having the general structural formula

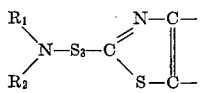

wherein $R_1$ represents a member of the class consisting of hydrogen, alkyl, aralkyl, and cycloalkyl groups, $R_2$ represents a member of the class consisting of alkyl, aralkyl, and cycloalkyl groups.

3. Compounds having the general structural formula

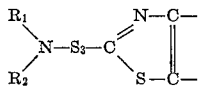

wherein

represents a dialkylamino group.

4. Diethylamino 4,5-dimethylthiazyl trisulphide.

5. Cyclohexylamino 4,5-dimethylthiazyl trisulphide.

6. The method of preparing an amino azyl polysulphide which comprises reacting a compound having the general formula with an aliphatic amine and eliminating the ammonium azyl sulphide from the reaction product and recovering an amino azyl polysulphide product.

7. The method of preparing an amino azyl polysulphide which comprises reacting a dithiazyl tetrasulphide with an aliphatic amine and eliminating the ammonium thiazyl sulphide from the product and recovering an amino azyl polysulphide product.

8. The method of preparing an amino azyl polysulphide which comprises reacting a dithiazyl tetrasulphide with a dialkyl amine and eliminating the dialkylammonium thiazyl sulphide from the product and recovering an amino azyl polysulphide product.

9. The method of preparing an amino azyl polysulphide which comprises reacting a dithiazyl tetrasulphide with cyclohexyl amine and eliminating the cyclohexylammonium thiazyl sulphide from the product and recovering an amino azyl polysulphide product.

10. The method of preparing an amino azyl polysulphide which comprises reacting 4,5-dimethylthiazyl tetrasulphide with an aliphatic amine and eliminating the ammonium 4,5-dimethylthiazyl sulphide from the product and recovering an amino azyl polysulphide product.

PAUL C. JONES.